United States Patent [19]

Szantor

[11] Patent Number: 5,218,778

[45] Date of Patent: Jun. 15, 1993

[54] FISHING LURE

[76] Inventor: Alfons J. Szantor, 871 Colonial Dr., Chippewa Falls, Wis. 54729

[21] Appl. No.: 889,641

[22] Filed: May 28, 1992

[51] Int. Cl.⁵ ............................................. A01K 85/00
[52] U.S. Cl. ................... 43/42.41; 43/42.44; 43/42.52
[58] Field of Search .................. 43/42.1, 42.53, 42.41, 43/42.44

[56] References Cited

U.S. PATENT DOCUMENTS

| | | | |
|---|---|---|---|
| 378,678 | 2/1888 | Harlow | 43/42.52 |
| 1,537,266 | 5/1925 | Ryan | 43/42.41 |
| 1,711,200 | 4/1929 | Heddon | 43/42.41 |
| 2,281,480 | 4/1942 | Clark | 43/42.44 |
| 2,605,575 | 8/1952 | Ebert | 43/42.52 |
| 2,611,208 | 9/1952 | Alexath | 43/42.52 |
| 2,614,356 | 10/1952 | Kayes | 43/42.41 |
| 2,651,877 | 9/1953 | Olson | 43/42.41 |
| 2,814,149 | 11/1957 | Hunicke | 43/42.41 |
| 5,107,615 | 4/1992 | Shaffer | 43/42.41 |

FOREIGN PATENT DOCUMENTS

| | | | |
|---|---|---|---|
| 79876 | 9/1955 | Denmark | 43/42.41 |
| 82278 | 3/1957 | Denmark | 43/42.41 |
| 941943 | 4/1956 | Fed. Rep. of Germany | 43/42.1 |
| 538500 | 6/1956 | Italy | 43/42.41 |
| 274149 | 6/1951 | Switzerland | 43/42.41 |

Primary Examiner—Kurt C. Rowan
Attorney, Agent, or Firm—James W. Miller

[57] ABSTRACT

An improved fishing lure comprises a lure body having a hook moveably mounted thereon. The hook moves between a first position in which its barbed end is located within a protective opening in the lure body and a second position in which the hook is located outside of the lure body for use in hooking a fish. A portion of the hook protrudes outside the lure body in the first position of the hook to be contacted by the mouth of the fish as the fish strikes the lure, thereby allowing the strike to be the motive force for moving the hook outside the lure body. Accordingly, the hook is protected within the lure body except for when the fish strikes the lure to minimize the chances of the lure being caught on weeds or similar underwater obstructions.

13 Claims, 1 Drawing Sheet

FISHING LURE

TECHNICAL FIELD

The present invention relates to fishing lures for use in catching fish and, more particularly, to artificial lures.

BACKGROUND OF THE INVENTION

Artificial fishing lures are well known for use in catching fish. Such lures have bodies which attract one or more species of fish. In some cases, the lures have three dimensional bodies that are shaped and colored to simulate or resemble a natural food source for the fish. In other cases, the lures may not directly resemble any natural food source, but nonetheless have a configuration and coloring which has been found to attract fish and induce them to strike the lure.

Fishing lures of this type have means for suspending one or more hooks therefrom. These hooks often comprise gang hooks having a plurality of barbs at one end. As the lure floats in the water and attracts the fish, the fish will strike the lure and close its mouth over the body of the lure. This causes the hook barbs to engage the fish and hook the fish on the lure.

One problem with prior art lures of this type is that the typical gang hooks suspended from the lure body are very susceptible to being caught on weeds or other underwater obstructions. If this happens, the fisherman may be able to dislodge the lure. However, it often happens that the lure cannot be dislodged and the fisherman has to cut the line and replace the lure with another one. This is not only inconvenient and time consuming to do when fishing, but expensive as well since lures cost anywhere from a few dollars to five or ten dollars. The problem is more acute since most of the best fishing occurs in areas having underwater weeds or other cover where fish tend to lurk. However, it is exactly these types of areas which also provide the most opportunities for having the hooks be caught on the weeds and the lure be lost.

SUMMARY OF THE INVENTION

The present invention relates to a "weedless" fishing lure which is much less prone to being hooked and lost on weeds or other, similar underwater obstructions.

An improved fishing lure according to the present invention minimizes any tendencies for the lure to be caught on weeds or similar underwater obstructions. The lure comprises a lure body having means for attaching the lure body to one end of a fishing line for suspending the lure body beneath the water. At least one hook is mounted on the lure body for movement between first and second positions relative to the lure body. The hook has barbed engagement means for hooking a fish. The lure body includes a protective opening in which the barbed engagement means of the hook is substantially located when the hook is in its first position such that the barbed engagement means is protected from catching on weeds or similar underwater obstructions in the first position of the hook. The barbed engagement means in the second position of the hook is moved outside of the protective opening in the lure body to expose the barbed engagement means to allow such barbed engagement means to hook a fish in the second position of the hook. A means is carried on the lure body responsive to the action of a fish striking the lure body for moving the hook between its first and second positions, whereby the hook has its barbed engagement means exposed only when a fish strikes the lure body.

BRIEF DESCRIPTION OF THE DRAWINGS

The present invention will be described hereafter in the Detailed Description, taken in conjunction with the following drawings, in which like reference numerals refer to like elements or parts throughout.

DETAILED DESCRIPTION

The present invention relates to an improved fishing lure for use in catching fish. A first embodiment of such a lure is shown in FIGS. 1-4 generally as 2.

Figure 1:
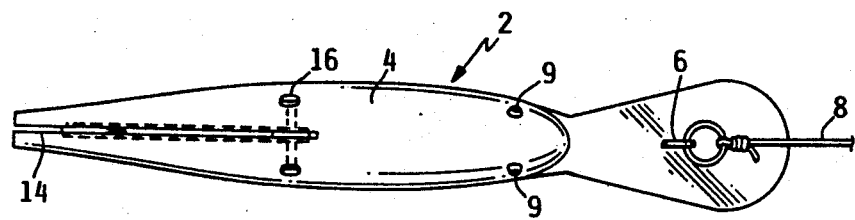
FIG. 1 is a top plan view of a first embodiment of an improved fishing lure according to the present invention.

Referring to FIG. 1, lure 2 comprises an elongated, three dimensional lure body 4 made of a substantially solid material, such as wood, plastic, etc. Lure body 4 includes at the front end an eyelet 6 to which one end of a fishing line 8 is tied or otherwise secured. Fishing line 8 suspends lure 2 beneath the surface of a body of water to attract fish and, hopefully, cause the fish to strike the lure.

Lure body 4 is shaped and colored in any suitable manner to attract fish. For example, the shape and coloring of lure 2 can be those which allow lure 2 to simulate or resemble a natural food source for a particular fish species. For lure 2 as shown in FIGS. 1–4, lure body 4 resembles a small fish or minnow, complete with artificial eyes 9, that would be a natural food source for a larger game fish. Fishing lures 2 of this type are well known. The present invention is not limited to a particular lure for a particular fish, but has general application to artificial lures 2 of many kinds.

Typically, artificial fishing lures 2 of the type shown herein have one or more hooks suspended beneath lure 2. These hooks are often gang hooks in which the barbed end of the hook has a plurality of barbs, e.g. three or four barbs, on which the fish could be hooked. Since lures of this type wouldn't typically have the hooks be baited, these exposed hooks and their multiple barbs can be easily caught on subsurface weeds or other underwater obstructions. If the hook cannot be freed, as is often the case, the fisherman has to cut the line leaving the lure in the water and then has to replace the lure with a new one. This is obviously undesirable due to the time and effort involved in doing so and the expense encountered in replacing lost lures.

The present invention comprises a "weedless" fishing lure 2 designed to greatly reduce, if not entirely eliminate, the occasions on which lure 2 will be caught or hooked on subsurface weeds or obstructions. Referring to FIGS. 1-4, lure body 4 includes a single J-shaped hook 10 having a barbed outer end 12 which constitutes the engagement means for hooking the fish. Preferably, lure body 4 has a longitudinal slot 14 passing through body 4 over its rearward end. Hook 10 is pivotally mounted on lure body 4 for rotation about a pivot axis defined by a pivot rod 16 carried on lure body 4. Hook 10 is arranged to be located at least partially within slot 14 on lure body 4.

Figure 2:
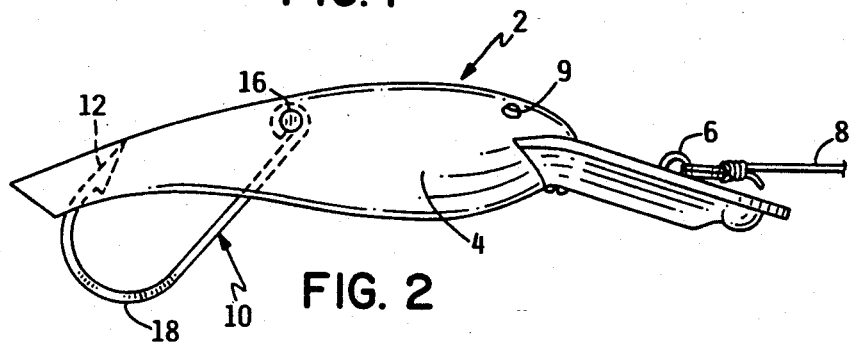
FIG. 2 is a side elevational view of the fishing lure shown in FIG. 1, particularly illustrating the hook in its first position relative to the body in which the barbed engagement means of the hook is concealed within and protected by the body.

Referring now to FIG. 2, barbed end 12 of hook 2 is located substantially within slot 14 and inside lure body 4 in a first position of hook 10. In this first position, the intermediate portion 18 of the J-shaped hook 10, i.e. the portion located between the ends of the hook, is arranged to extend outside of lure body 4 to be located beneath lure body 4. This first position of the hook is the normal position of hook 10 relative to lure body 4 before a fish strikes lure 2. In this position, barbed hook end 12 is protected and hidden within lure body 4. Barbed end 12 does not extend out of lure body 4 and is not, therefore, able to be caught on weeds, subsurface trees or rocks, or other underwater obstructions.

Figure 3:
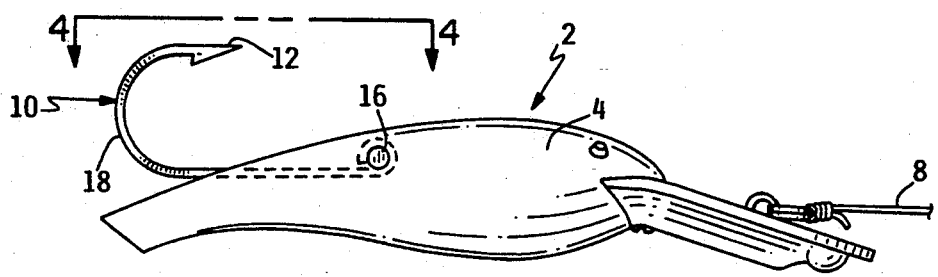
FIG. 3 is a side elevational view of the lure shown in FIG. 1, generally similar to the view of FIG. 2, but showing the hook having been moved to its second position relative to the body in which the barbed engagement means is extended out of the body in a position for hooking a fish.

Referring now to FIG. 3, when a fish strikes lure 2 its mouth will close on lure 2 and will engage against the protruding hook portion 18. The closing action of the mouth of the fish on the lure will compress hook portion 18 against lure body 4 to pivot hook 10 about pivot rod 16 from its first position shown in FIG. 2 to a second position shown in FIG. 3. In this second position, barbed end 12 of hook 10 is extended outside of slot 14 and outside of lure body 4 to be located in an exposed position where it can hook the fish. Thus, the closing action of the mouth of the fish on hook 10 is sufficient to actually move hook 10 from its protected first position to its exposed second position.

The present invention is obviously advantageous in that it provides a lure 2 which normally cannot be caught on weeds or other subsurface obstructions when fishing. Thus, the fisherman can use this lure with a great deal of confidence in even the most weedy fishing environments without fear of losing many lures of this type. As lure 2 moves through the water, hook 10 is protected within lure body 4 and the only protruding portion 18 of hook 10 forms a smooth curve without any exposed ends. This protruding hook portion 18 is simply not susceptible of being hooked on anything. Accordingly, lure 2 will not usually catch on subsurface obstructions or weeds.

However, lure 2 is still effective for catching fish. As soon as the fish strikes lure 2, hook 10 is rotated upwardly out of lure body 4 to expose barbed hook end 12 to hook the fish. Thus, lure 2 will be effective for catching fish, but yet largely avoids the disadvantages of prior art fishing lures of this type of being prone to being lost.

It is desirable that hook 10 be resiliently retained in the first position shown in FIG. 2 so that as lure 2 is pulled through weeds or other underwater obstructions the passing engagement of the weeds or obstructions against the protruding hook portion 18 will be insufficient to pivot hook 10 up out of lure body 4. In other words, there should be some retention force on hook 10 so that relatively small upward forces on hook portion 18 will not extend hook 10 out of lure body 4. This retaining force can be provided in many different ways as will be apparent hereafter.

Figure 4:
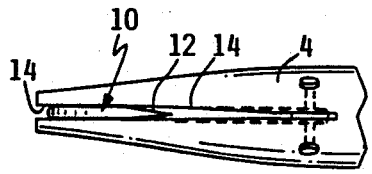
FIG. 4 is a partial top elevational view of a portion of the fishing lure shown in FIG. 1, taken along lines 4—4 in FIG. 3.

Lure 2 as shown in FIGS. 1-4 utilizes one type of hook retaining means. Referring to FIGS. 1 and 4, longitudinal slot 14 in lure body 4 is slightly undersized relative to the width of hook 10 so that hook 10 in its storage position shown in FIG. 2 is, in effect, resiliently gripped or held by the sides of slot 14. Thus, as lure 2 is dragged through weeds, this resilient gripping force will prevent hook 10 from being extended outside of lure body 4. However, when a fish strikes hook 10, the action of the mouth of the fish on the protruding hook portion 18 will be sufficient to pivot hook 10 upwardly through slot 14. As hook 10 is moved upwardly, it will slightly spread apart or expand slot 14 in order to be able to move outwardly from slot 14. FIG. 4 illustrates hook 10 in its exposed second position having slightly expanded the slot 14 in lure body 4.

Other alternative retaining means could be used for preventing hook 10 from inadvertently being moved outside of lure body 4. For example, a torsional spring (not shown) could be used surrounding pivot rod 16 with one end of the spring anchored to lure body 4 and the other end of the spring connected to hook 10. Such a torsional spring would be located to resiliently bias hook 10 downwardly into slot 14. If such a spring is used, slot 14 would not need to be undersized as described above. The tension of the spring could obviously be adjusted to provide a biasing force on hook 10 which is sufficient to resist any upward forces likely to be caused by weeds or other underwater obstructions engaging hook portion 18, but which biasing force will be overcome when a fish strikes the lure to extend hook 10 from lure body 4.

Figure 6:
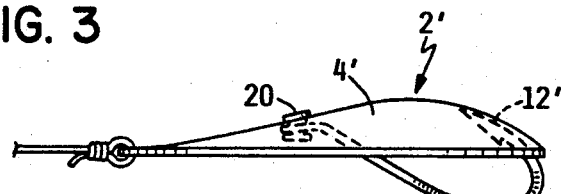
FIG. 6 is a side elevational view of the fishing lure shown in FIG. 5, particularly illustrating the hook in its first position in which the barbed engagement means is concealed within and protected by the body.
Figure 5:
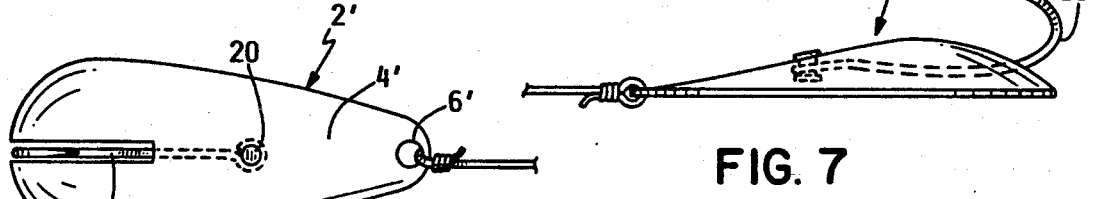
FIG. 5 is a top plan view of a second embodiment of an improved fishing lure according to the present invention.
Figure 7:
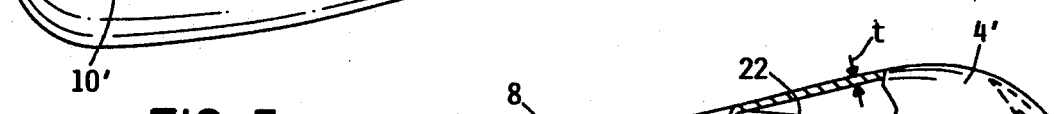
FIG. 7 is a side elevational view of the fishing lure shown in FIG. 5, generally similar to the view of FIG. 6, but showing the hook having been moved to its second position in which the barbed engagement means is located outside of the body.

A second embodiment of the present invention is illustrated in FIGS. 5-7 as 2'. This embodiment is similar in concept and structure to that shown in FIGS. 1-4, but illustrates the invention built as part of a different lure 2'. More specifically, lure 2' in FIGS. 5-7 is one that is often called a spoon. To the extent lure 2' has components which correspond to the components of lure 2, they will be referred to by the same reference numerals with a prime designation, e.g. lure 2' rather than lure 2, lure body 4' rather than lure body 4, etc.

Figure 8:
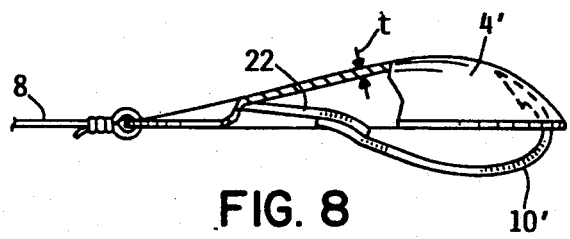
FIG. 8 is a side elevational view, partially broken away, of a slightly modified form of the fishing lure shown in FIG. 5.

Lure 2' shown in FIGS. 5-7 is called a spoon because it has a lure body 4' shaped like a spoon. Lure 2' is three dimensional as there is a depth or thickness to the spoon defined by the vertical curvature of the spoon and there is an obvious length and width to the spoon. Thus, lure 2' is three dimensional when viewed between its lowermost edge and the uppermost surface of lure body 4'. However, lure 2' is not a substantially solid body like that of lure 2 shown in FIGS. 1-4. Instead, lure 2' has a relatively constant thickness, shown as t in FIG. 8, and is made from a metal or similar material which is simply bent or otherwise formed in the required spoon shape.

Again, lure 2' incorporates a moveable hook 10' which may be secured to lure body 4' of the spoon by an attachment means such as a rivet 20. Hook 10' is arranged to have the first protected position shown in FIG. 6, corresponding to the protected position of lure 2 shown in FIG. 2, and an extended position shown in FIG. 7, corresponding to the extended position of lure 2 shown in FIG. 3. In its protected or storage position of FIG. 6, barbed end 12' of hook 10' again is retained and hidden within the three dimensional confines of lure 2'. More particularly, as shown in FIG. 5, barbed end 12' of hook 10' is located in an elongated slot 14' cut into the rear portion of lure body 4'. Accordingly, hook 10' has first and second positions relative to lure body 4' which correspond to the same positions described earlier for lure 2.

Lure 2' functions identically to lure 2, namely hook 10' will normally be protected by lure body 4' to prevent it from being caught on weeds or other subsurface obstructions. However, when a fish strikes, the closing action of the mouth of the fish will be effective to pivot hook 10' upwardly and through the slot 14' in the rear of lure body 4'. In this position as shown in FIG. 7, hook 10' is capable of catching the fish.

Desirably, lure 2' as shown in FIGS. 5-7 also has a biasing force for retaining hook 10' in its first, protected position. Hook 10' can be made from a spring type material that will have the shape and relative location shown in FIG. 6 in an unstressed condition. Then, any upward force on hook 10' tending to raise it out of lure body 4' will create a biasing force within hook 10' tending to return it to its normal, unstressed orientation. Thus, a natural spring force can be present in hook 10', due to the materials and shape of hook 10', which biases hook 10' into its FIG. 6 position.

Alternatively, a separate leaf spring 22 could be used extending between one end of hook 10' and the underside of lure body 4' for providing a downward biasing force. This separate leaf spring 22 could be soldered or otherwise suitably attached to both the underside of lure body 4' and the end of hook 10'. Leaf spring 22 would inherently provide the downward biasing force on hook 10' that is desired.

The present invention has been described in conjunction with lures 2 and 2' in which lure bodies 4 and 4' are three dimensional. In the case of lure 2 in FIGS. 1–4, lure body 4 is a three dimensional, solid body. In the case of lure 2' in FIGS. 5–8, lure body 4' is still three dimensional, but is no longer solid having a cavity formed on its underside by the spoon shape of lure 2.

However, the use of a three dimensional lure body is not strictly necessary to the present invention. For example, a flat, planar lure body could be provided similar to the spoon of FIGS. 5–7, but not having the three dimensional vertical curvature of lure body 4'. A hook could be provided on such a lure body in which the intermediate portion of the hook extends down beneath the lure body to be exposed with the barbed end still located in a slot at the rear end of the lure body. The lure body could have a thickness sufficient to entirely enclose the barbed hook end in the slot, or the lower or upper edges of the barbed hook end might protrude a small amount outside of the slot but not enough to pose any threat of being caught on a weed or other obstruction.

The two dimensional lure described above would still have the advantages of and be covered by the present invention. The barbed end of the hook would not be significantly exposed and would not run any great risk of being caught or otherwise hooked on underwater obstructions. Yet, the closing of the mouth of the fish over the lure body would be sufficient to cause the hook to be extended upwardly above the plane of the lure body. Accordingly, the term lure body as used herein and in the claims of this application is not intended to relate solely to a three dimensional lure body, but would include a two dimensional lure body as well.

Various modifications of this invention will be apparent to those skilled in the art. For example, the hook could be mounted on the lure body to vertically reciprocate up and down relative to the body, rather than pivot on the body. In addition, while it is simplest to have the protruding hook portions 18 or 18' located outside the body to be contacted by the fish, the hook could be entirely enclosed within the body. In this latter event, some means would have to be provided protruding outside the body and connected to the hook, i.e. an actuator of some type, which gets compressed towards the lure body when the fish strikes to move the hook out of the body. Thus, the scope of the present invention will be limited only by the appended claims.

I claim:

1. An improved fishing lure which minimizes the tendencies for the lure to be caught on weeds or similar underwater obstructions, which comprises:
    (a) a lure body having means for attaching the lure body to one end of a fishing line for suspending the lure body beneath the water;
    (b) at least one hook mounted on the lure body for movement between first and second positions relative to the lure body, wherein the hook has barbed engagement means for hooking a fish;
    (c) wherein the lure body includes a protective opening in which the barbed engagement means of the hook is substantially located when the hook is in its first position such that the barbed engagement means is protected from catching on weeds or similar underwater obstructions in the first position of the hook, wherein the barbed engagement means in the second position of the hook is moved outside of the protective opening in the lure body to expose the barbed engagement means to allow such barbed engagement means to hook a fish in the second position of the hook, wherein the protective opening of the lure body comprises a relatively narrow, elongated slot which through which the hook passes upwardly and downwardly as it moves between its first and second positions with the barbed engagement means of the hook being located substantially within the slot in the first position of the hook;
    (d) means carried on the lure body responsive to the action of a fish striking the lure body for moving the hook between its first and second positions, whereby the hook has its barbed engaged means exposed only when a fist strikes the lure body; and
    (e) means for exerting a retaining force on the barbed engagement means of the hook to keep the barbed engagement means of the hook within the slot to prevent inadvertent movement of the hook between its first and second positions caused by contact between weeds or similar underwater obstructions with the hook moving means, wherein the width of the slot is slightly smaller than the width of the hook and the lure body is expandable adjacent the slot such that the slot itself resiliently grips the sides of the hook to thereby comprise the retaining means with the hook being able to expand the slot enough to pass outwardly from the slot when the fish strikes the lure body.

2. A fishing lure as recited in claim 1, wherein the hook moving means is a portion of the hook which protrudes outwardly from the lure body in the first position of the hook.

3. A fishing lure as recited in claim 2, wherein the protruding hook portion is contained on the lure body in a location in which the protruding hook portion will be compressed inwardly towards the lure body by the mouth of the fish as the fish strikes the lure, whereby the barbed engagement means is located on the hook relative to the hook body such that the inward compression of the protruding hook portion by the action of the fish striking the lure will simultaneously extend the barbed engagement means out from the protective opening in the lure body.

4. A fishing lure as recited in claim 2, wherein the hook is pivotally carried on the lure body for a pivoting motion between its first and second positions.

5. A fishing lure as recited in claim 4, wherein the hook has a first end which pivotally secures the hook to the lure body, a second end which carries the barbed engagement means, and an intermediate connecting section which connects the first and second ends together, wherein the intermediate connecting section forms the protruding hook portion that is located outside of the lure body in the first position of the hook.

6. A fishing lure as recited in claim 5, wherein the hook has its first end pivotally carried on the lure body such that the hook passes through the slot with the second end of the hook being located substantially entirely within the slot in the first position of the hook and being located outside the slot in the second position of the hook.

7. A fishing lure as recited in claim 1, wherein the hook comprises a single hook having a barbed end with a single barb.

8. A fishing lure as recited in claim 1, wherein the lure body is three dimensional.

9. A fishing lure as recited in claim 8, wherein the lure body is a substantially solid body.

10. A fishing lure as recited in claim 8, wherein the lure body is a body made from a planar piece of material formed into a spoon shape.

11. A fishing lure for use in catching fish, which comprises:
(a) a lure body having means for attaching a fishing line to one end of the lure body, the lure body having means for moveably supporting a hook thereon;
(b) at least one hook moveably carried on the lure body with the hook having a barbed end, the hook being supported on the lure body in a moveable fashion to move from a first position to a second position, wherein the barbed end of the hook in the second position thereof is located further away from the lure body than in the first position of the hook, whereby the barbed end of the hook in the second position of the hook is more easily hooked with the fish than in the first position of the hook;
(c) means carried on the lure body responsive to the action of a fish striking the lure body for moving the hook between its first and second positions; and
(d) means for exerting a retaining force on the hook to normally keep the hook in its first position, wherein the lure body includes a relatively narrow, elongated slot through which at least a first portion of the hook passes upwardly and downwardly as the hook moves between its first and second positions, wherein the width of the slot is slightly smaller than the width of the first portion of the hook and the lure body is expandable adjacent the slot such that the slot itself resiliently grips the sides of the first portion of the hook to thereby comprise the retaining means with the first portion of the hook being able to expand the slot enough to allow the hook to pass between its first and second positions when the fish strikes the lure body and engages the hook moving means.

12. A fishing lure as recited in claim 11, wherein the hook is pivotally carried on the lure body.

13. A fishing lure as recited in claim 11, wherein the hook moving means comprises a second portion of the hook which is shaped relative to the lure body to extend outside of the lure body in the first position of the hook to be exposed for contact with the mouth of the fish, whereby the closing action of the mouth of the fish on the lure as the fish strikes the lure acts against the second, protruding hook portion and is the motive force for moving the hook between its first and second positions.

* * * * *